United States Patent [19]

Ishizuka

[11] Patent Number: 4,841,475
[45] Date of Patent: Jun. 20, 1989

[54] DATA TRANSFER SYSTEM AND METHOD FOR CHANNELS WITH SERIAL TRANSFER LINE

[75] Inventor: Takuo Ishizuka, Hadano, Japan
[73] Assignee: Hitachi, Ltd., Tokyo, Japan
[21] Appl. No.: 911,785
[22] Filed: Sep. 26, 1986
[30] Foreign Application Priority Data
    Oct. 1, 1985 [JP] Japan ............................ 60-218902
[51] Int. Cl.⁴ .................................................. G06F 9/00
[52] U.S. Cl. ................................... 364/900; 364/946.3
[58] Field of Search ................................ 364/200, 900
[56] References Cited
    U.S. PATENT DOCUMENTS
    4,272,815  6/1981 Kadowaki et al. ............... 364/200
    4,355,354 10/1982 Kempf et al. .................... 364/200
    4,424,565  1/1984 Larson ............................ 364/200
    4,484,263 11/1984 Olson et al. ..................... 364/200
    4,546,429 10/1985 Chan et al. ...................... 364/200
    4,712,176 12/1987 Fredericks et al. .............. 364/200

Primary Examiner—Gareth D. Shaw
Assistant Examiner—John G. Mills
Attorney, Agent, or Firm—Antonelli, Terry & Wands

[57] ABSTRACT

An apparatus for transferring data between a memory and an input/output device via a serial data transfer line including a central channel unit for sending to the input-/output device a chaining instruction for chaining data stored at a plurality of locations in the memory, a remote channel unit for requesting from the central channel unit a new command causing the transfer of any succeeding data, and a unit for informing a data processing unit of an amount of data which has not been transferred from the memory to the input/output device.

8 Claims, 7 Drawing Sheets

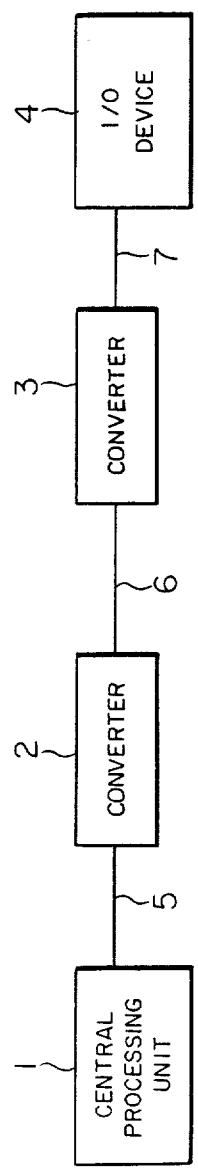
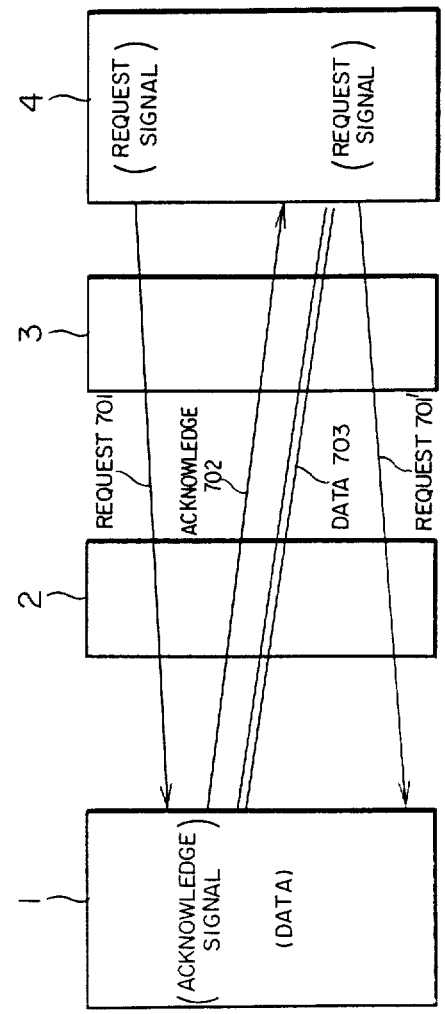

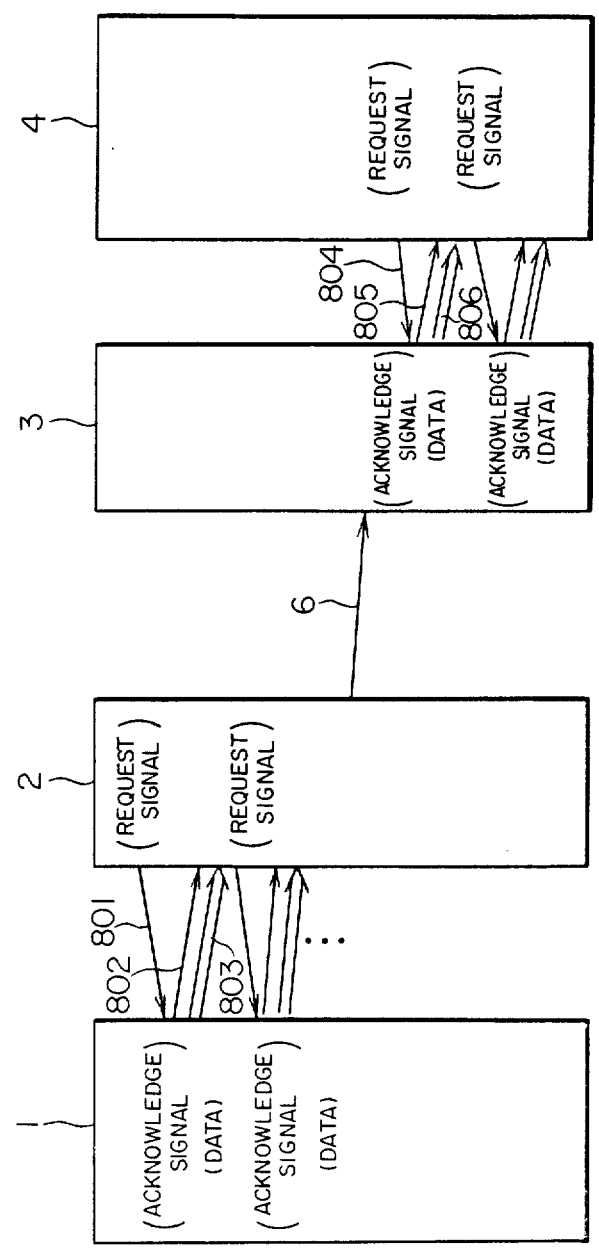

FRAME(S) GIVEN BY FRAME GENERATORS 33, 71
CHANNEL COMMAND RENEWAL FRAME
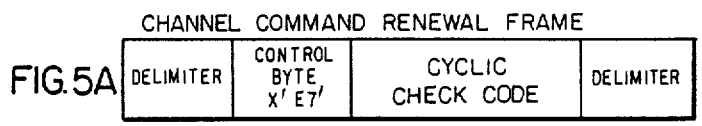
DATA WRITE REQUEST FRAME
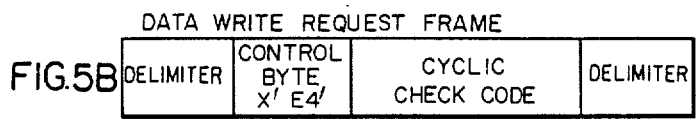
DATA CHAINING INSTRUCTION FRAME
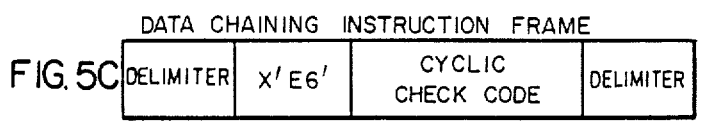
DATA TRANSFER FRAME
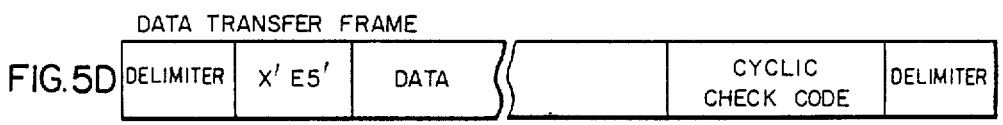
END FRAME 1
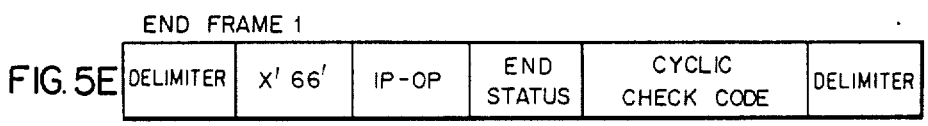
END FRAME 2
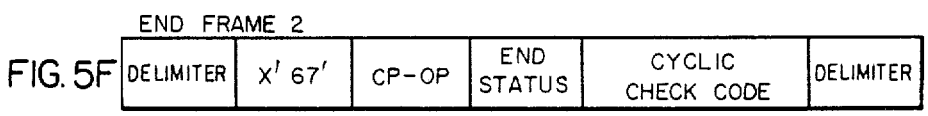
STARTING FRAME
CHANNEL COMMAND WORD (CCW)
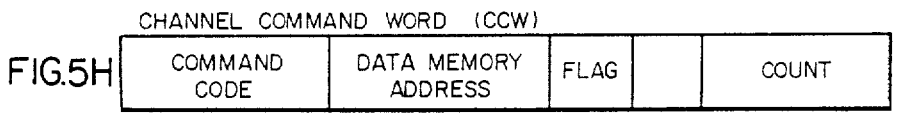

DATA TRANSFER SYSTEM AND METHOD FOR CHANNELS WITH SERIAL TRANSFER LINE

BACKGROUND OF THE INVENTION

The present invention relates to a channel device of a computer system, and more particularly to a channel system suitable for a long distance data transfer between a processor and I/O devices, wherein a channel device is divided into a central channel device and a remote channel device with respect to its function, and the two devices are connected via a serial transfer line such as an optical fiber.

Data chaining, channel command and command chaining are described in the specification of U.S. Pat. No. 4,272,815 entitled "CHANNEL CONTROL SYSTEM FOR CONTROLLING DATA TRANSFER THROUGH A PLURALITY OF CHANNELS WITH PRIORITY ASSIGNMENT".

As shown in FIG. 1, long distance data transfer between a central processing unit 1 and an I/O device 4 has been realized heretofore by interposing interface converters 2 and 3 between I/O interfaces 5 and 7 respectively of the central processing unit 1 and the I/O device 4. In FIG. 1, the interface converter 2 converts parallel signals from the I/O interface 5 into serial signals and sends them via a serial interface line 6 such as an optical fiber to the interface converter 3 which in turn converts the serial signals into I/O parallel interface signals and sends them via the I/O interface 7 to the I/O device 4. Signals from the I/O device 4 are sent to the central processing unit 1 in an opposite manner to the above.

An example of data transfer sequence from the central processing unit 1 to the I/O device 4 according to a conventional method is shown in FIG. 2. Particularly, when a request signal 701 is outputted from the I/O device 4, it is transferred via the interface converters 2 and 3 to the central processing unit 1. In accordance with a transfer command in a program, the central processing unit 1 can send an acknowledge signal 702 and data 703. These operations (701 to 703) are repeated so many times as necessary after a request 701 to transfer required data.

With this method, it takes however a long time to carry out the sequence for the request and acknowledge signals and data transfer if the number of I/O devices communicating with the central processing unit is large, because the speed of an I/O device is low. Thus, performance of the system is degraded.

To solve this problem, a system providing buffer memories in the interface converters 2 and 3 is known as in Japanese Patent Kokai (Laid-Open) No. 57-212534. An analysis of this system was made by the present inventor to explain the problems included in data transfer sequence between the central processing unit and I/O devices, which sequence is shown in FIG. 3. Particularly, before a request signal is outputted from the I/O device 4, a sequence for inputting a predetermined amount of data 803 to the buffer storage of the interface converter 2 is preliminarily repeated after a request signal 801 and an acknowledge signal 802 are exchanged between the central processing unit and the interface converter 2. The inputted data is sent via the serial interface line 6 to the interface converter 3 and stored in the buffer storage thereof. The stored data 806 as well as an acknowledge signal 805 is sent to the I/O device 4 when a request signal 804 is outputted from the I/O device 4. In this manner, it is possible to shorten the time required for transfer of request and acknowledge signals and data between the central processing unit 1 and the I/O device 4, thus preventing degrading the system performance in spite of a long distance data transfer.

However, there are some problems with the system shown in FIG. 3: in a case where the I/O device 4 stops requesting data although data still remains in the buffer memories of the interface converters 2 and 3, since the central processing unit 1 judges that all transferred data has already been sent to the I/O device 4, the program is not supplied with a correct information that the remaining data is not actually sent. Also, during a succeeding data chaining transfer from different storage locations to the buffer storage of the interface converter 2, there may occur such a case that the I/O device completes the data transfer processing for the preceding command and the last address during data transfer for the preceding channel command word can not be informed to the program, although the central processing unit is going to execute the processing for a current command. This is an essential problem of this system since it is constructed such that the central processing unit operates without considering the operation of the interface converters interposed between the I/O interfaces.

SUMMARY OF THE INVENTION

An object of the present invention is to provide a system and method capable of data chaining transfer via buffers and serial transfer lines.

Another object of the present invention is to provide a system and method, wherein the system is constructed such that a channel device is divided into a central channel device and a remote channel device both having a buffer storage and connected by serial transfer lines, wherein the end address of a last channel command word of a channel program, and the count of remaining bytes can be regarded quite the same as those of the I/O interfaces without serial transfer lines and wherein performance degrading is not encountered.

A further object of the present invention is to provide an apparatus capable of a long distance data transfer between a central processing unit and I/O devices via a long serial interface line without necessitating the program to execute the processings different from those of a conventional channel device garanteed with a channel command word address and the count of remaining bytes.

As described with FIG. 3, in a system whose buffer memories are divided into two portions on the central and remote sides, channel command words under execution at the central and remote channel devices become different if an advanced transfer control for next data on the central side in parallel with the transfer for chaining data on the remote side is performed. Therefore, according to the present invention, during execution of a command group for data chaining, a pause between data for each command is informed from the central channel device (hereinafter called CCH) to the remote channel device (hereinafter called RCH), and after the data has been transferred to the I/O device, the remote channel device informs the central channel device of the end of operations associated with the channel command word, thus enabling the controlling of the execution of a command group in cooperative association between the central and remote channel devices.

BRIEF DESCRIPTION OF THE DRAWINGS

FIGS. 1 and 2 show a conventional data transfer system;

FIG. 3 is a schematic diagram for explaining the subject matter of the present invention;

FIGS. 5A to 5H show examples of frames and a channel command word to be sent and received between channel devices;

DETAILED DESCRIPTION OF THE PREFERRED EMBODIMENT

Figure 4:
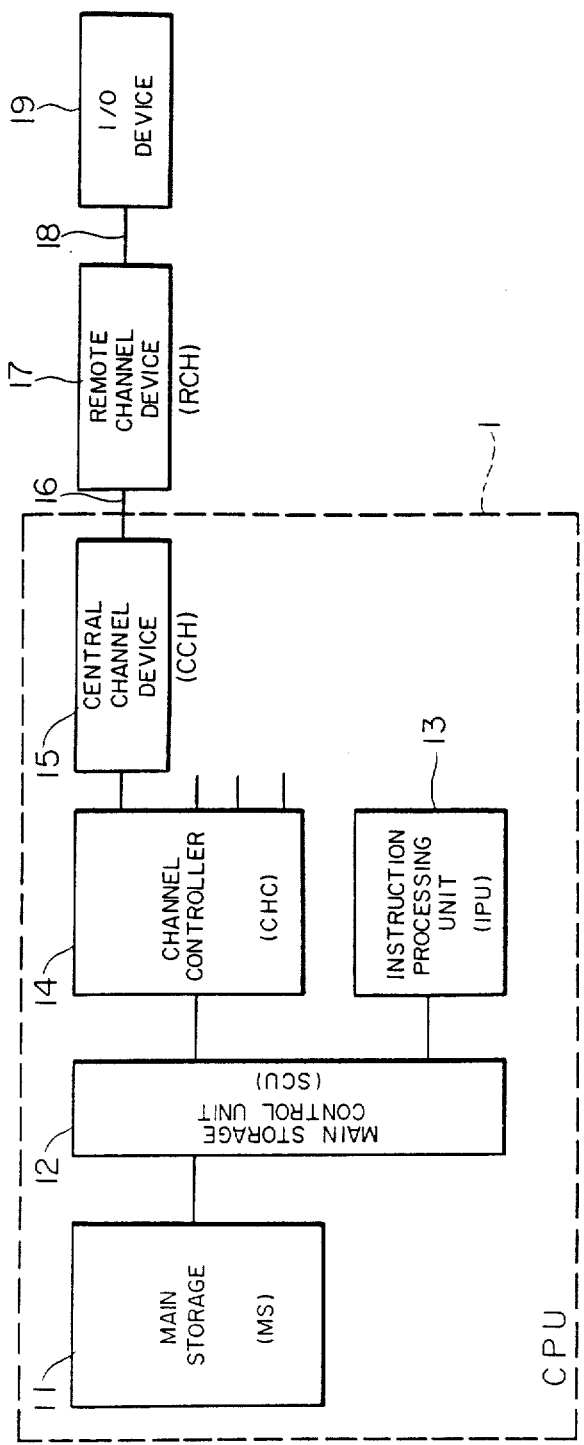
FIG. 4 is a block diagram showing the entire system according to the present invention.

FIG. 4 is a block diagram showing an outline of the system according to the present invention. In FIG. 4, a central processing unit (CPU) 1 is constructed of a main storage (MS) 11, a main storage control unit (SCU) 12, an instruction processing unit 13, a channel controller 14 and a central channel device (CCH) 15. The channel controller 14 with a plurality of central channel devices 15 connected thereto reads channel commands from the main storage 11, transfers data between each channel device 15 and the main storage, and writes the end of execution of a channel command into the main storage 11. The main storage may be connected either externally or internally of CPU 1. The central channel device 15 is connected to a remote channel device (RCH) 17 via a serial interface line 16 such as an optical fiber cable. The remote channel device 17 is connected to an input/output (I/O) device 19 via an I/O interface 18. Data transfer between the central and remote channel devices 15 and 17 is conducted in units of frames.

Figure 7:
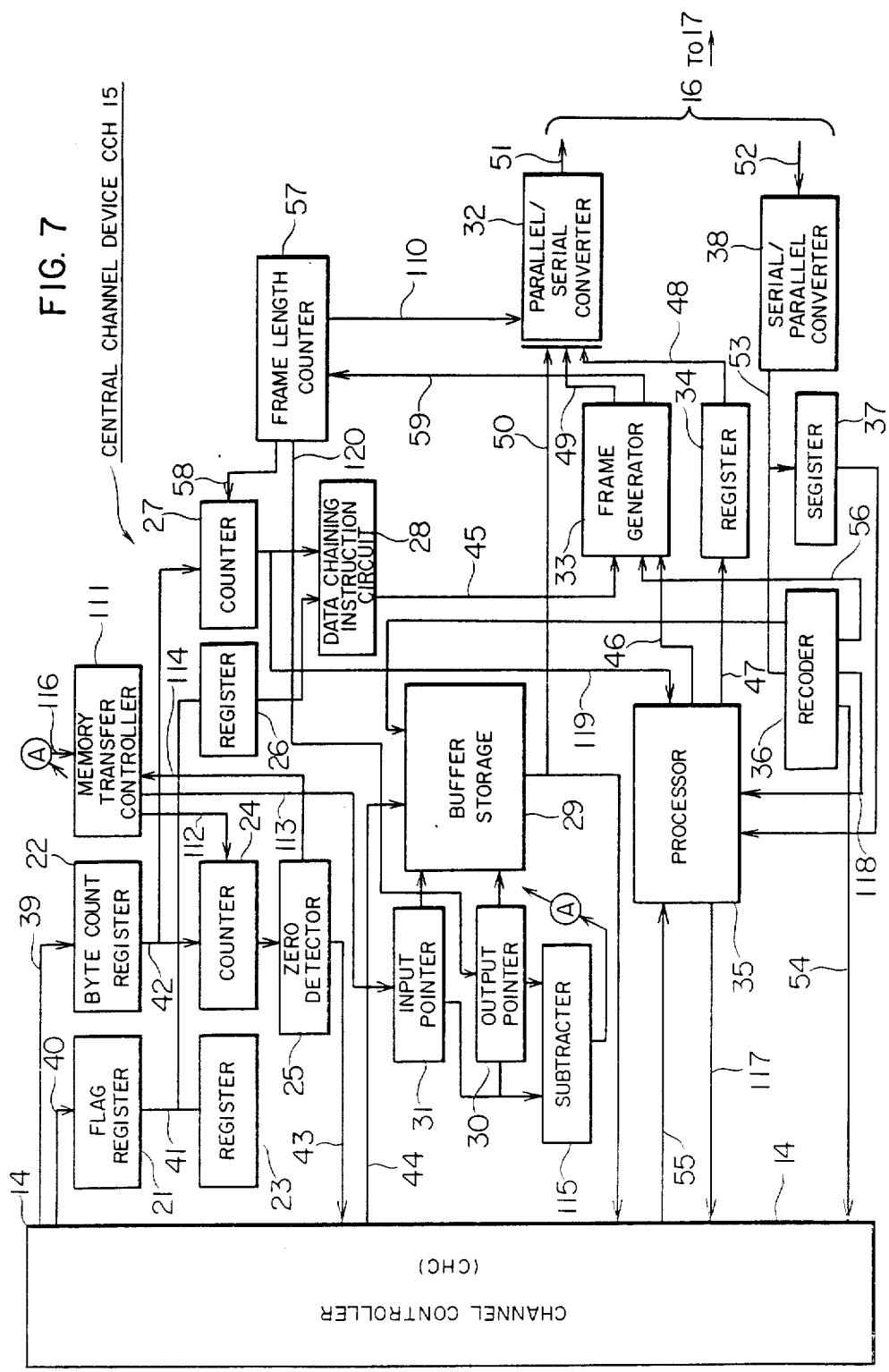
FIG. 7 is a detailed block diagram of a central channel device.
Figure 8:
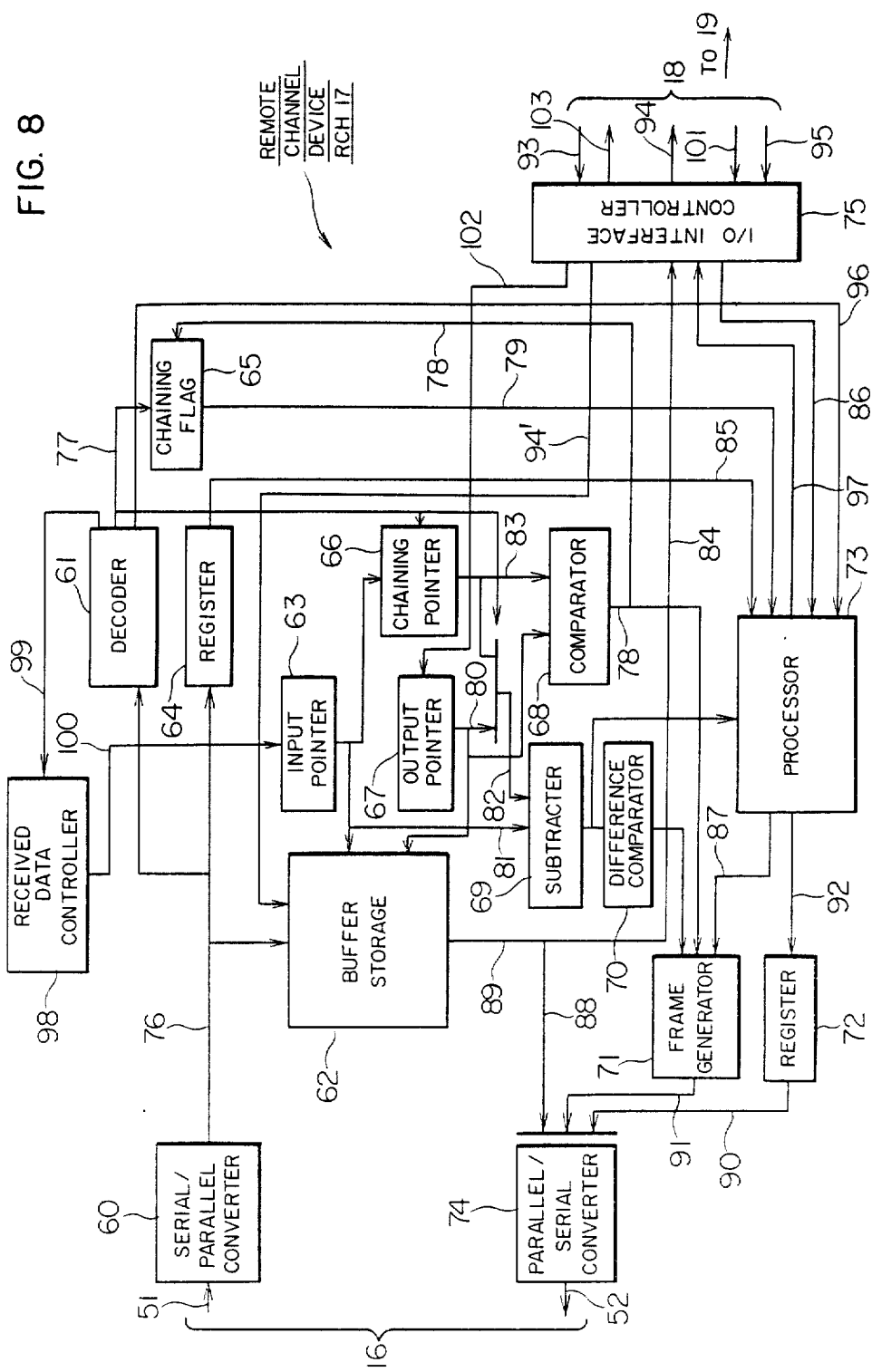
FIG. 8 is a detailed block diagram of a remote channel device.

Detailed circuit portions of the central and remote channel devices relevant to the present invention are shown respectively in FIGS. 7 and 8. FIGS. 5A to 5G show examples of frames to be sent and received in units of frames between the central and remote channel devices 15 and 17.

In the frames shown in FIGS. 5A to 5G, "delimiter" is a specific code representative of the start and end of the frame and is produced by parallel/serial converters 32 and 74, and "control byte" is a code representative of the type of the frame and is produced by processors 35 and 73 of frame generators 33 and 71. A "cyclic check code" is a code for use with cyclic check of bits in the frame and is produced by the parallel/serial converters 32 and 74, bits being checked by serial/parallel converters 38 and 60 via transfer lines 51 and 52. A "data" field in a data transfer frame is used for transferring data stored in buffer memories 29 and 62. An "IP−OP" of an end frame 1 of FIG. 5E indicates a value of an input pointer 63 subtracted by a value of an output pointer 67 by a subtracter 69. A symbol "−" is a minus sign. Similarly, a "CP−OP" indicates a value of a chaining pointer 66 subtracted by a value of the output pointer 67. An "end status" indicates an end status of data transfer from the I/O interface to the CPU side channel device.

When an I/O instruction for data transfer to or from a connected I/O device is outputted from the instruction processing unit (IPC) 13, the channel controller 14 reads a channel command word (hereinafter abbreviated as CCW) from the main storage (MS) 11 via the main storage control unit (SCU) 12 to send a command code to the processor 35 of CCH 15 via line 55. The word CCW has a one-byte flag indicative of command chaining information and data chaining information suitable for the I/O device concerned. The format of CCW is shown in FIG. 5H. The processor 35 sets the command code and control data X"46" in a register 34 (X" " is a symbol for hexadecimal notation, and each frame has a specific value of control data), and outputs a frame transfer instruction to the frame generator 33 via line 46. The frame generator 33 makes the parallel/serial converter 32 transfer a starting frame (FIG. 5G), using data from line 48 as the command code and control data. As indicated by arrow 130 in FIG. 6, the serial/parallel converter 60 of RCH 17 receiving the starting frame sends the control data to a decoder 61 via line 76. The command code is set in a register 64. A decoded signal 96 of the control data X"46" is inputted to the processor 73 which then recognizes a reception of the starting frame and reads the command code from the register 64 to initiate by way of line 97 an initial setting of data transfer and a start processing with respect to the I/O device concerned via an I/O interface controller 75.

Next, the channel controller (CHC) 14 sets the flag (1 byte) of CCW in a register 21 of CCH 15 and the byte count of CCW, in a register 22. Further, the values in the registers 21 and 22 are respectively set via lines 41 and 42; in a register 23 which controls a data chaining instruction between the main storage 11 and a buffer storage 29; in a counter 24 which counts the data transfer amount between the main storage 1 and the buffer storage 29; in a register 26 which controls data transfer chaining between the buffer storage 29 and the transfer line 51 or 52; and in a counter 27 which counts the data transfer amount between the buffer storage 29 and the transfer line 51 or 52. Since the contents of the registers 21 and 22 are shifted to the next stage registers and have become vacant, the channel controller 14 reads the next channel command word and sets it in the registers 21 and 22.

Thereafter, data transfer is effected from the main storage (MS) to the I/O device 19.

Figure 6:
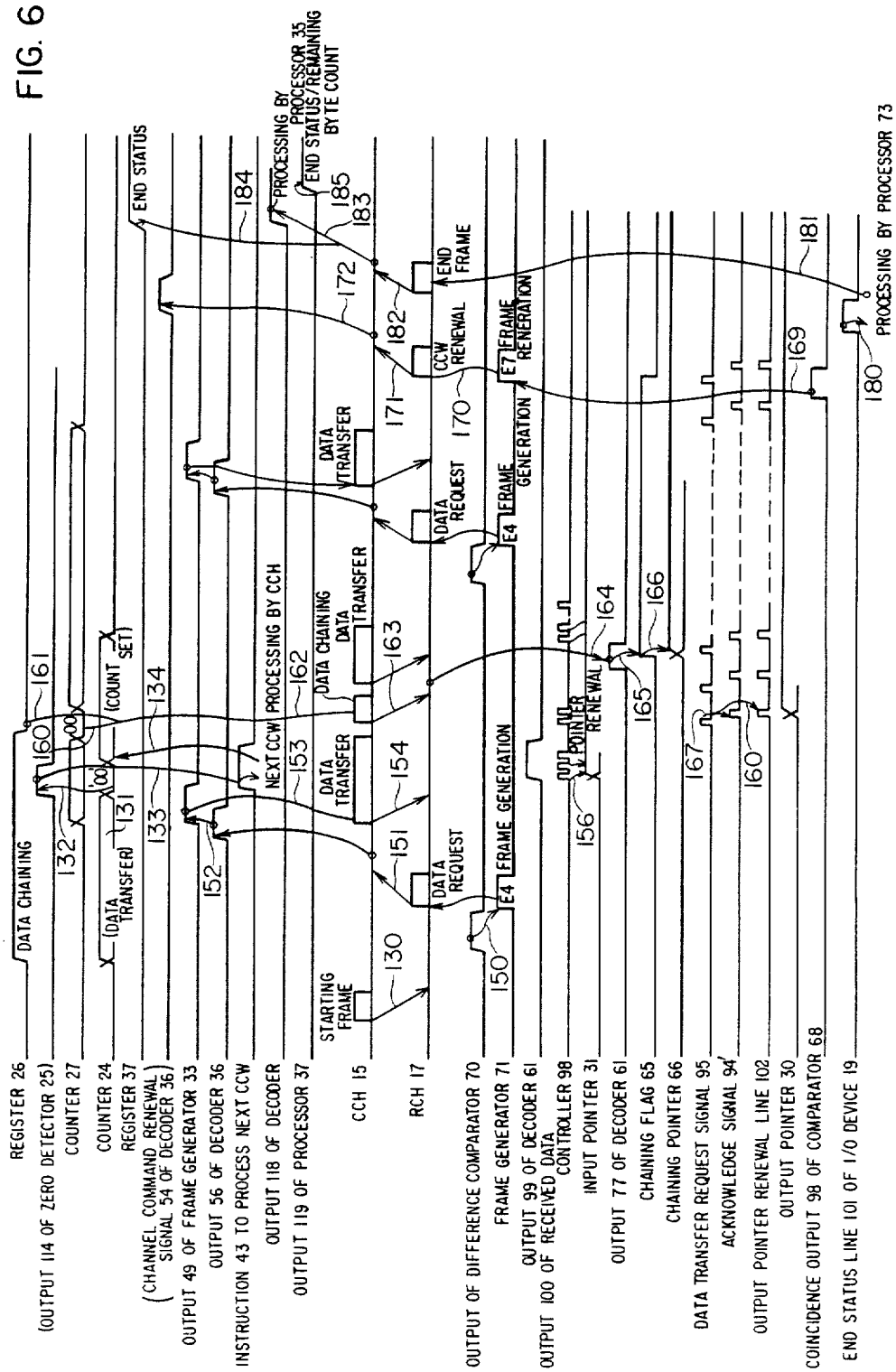
FIG. 6 is a timing chart of frames.

First, data transfer (numeral 131 of FIG. 6) from the main storage (MS) 11 to the buffer storage 29 of CCH 15 continues until the content of the counter 24 is made zero by a memory transfer controller 111 (controlled by an output 114 from a zero detector 25, as shown by arrow 132 of FIG. 6), or until the capacity of the buffer storage 29 becomes full (which is indicated by an output line 116 when the content of the input pointer 31 subtracted by that of the output pointer 30 by the subtracter 115 equals the buffer storage capacity). The address of data stored in the buffer storage 29 is indicated by the input pointer 31 which is sequentially renewed via line 113 by the memory transfer controller 111 every time one byte is transferred between the two storages. The counter 24 is decremented via line 112 by the memory transfer controller 111 by the amount corresponding to the data read from the main storage 11. As shown by arrow 132, when the content of the counter 24 becomes zero, the zero detector 25 outputs a signal 43, which instructs the channel controller (CHC) 14 to process the next channel command word as shown by arrow 133. The content of the register 22 is set in the counter 24 (arrow 134), and if data corresponding to the next channel command word exists, the data is transferred between the main storage 11 and the buffer storage 29.

On the side of the remote channel device (RCH) 17, upon initial setting by the write command, a difference between the input and output pointers 63 and 67 of the buffer storage 62 is calculated by the subtracter 69, and if the difference is decided larger than a preset value by a difference comparator 70 (arrow 150), a data request frame (FIG. 4B) having a control byte of X"E4" is sent to the central channel device (CCH) 15 via the transfer line 52.

The central channel device (CCH) 15 again converts this frame into parallel data at the serial/parallel converter 38. The control byte X"E4" is decoded by the decoder 36 (arrow 152) and sent to the frame generator 33 via line 56. The frame generator 33 instructs, via line 49, the parallel/serial converter 32 to send a data transfer frame (FIG. 4D) (arrow 153). The parallel/serial converter 32 transfers the data transfer frame whose control byte is X"E5" and whose frame data is that from line 50, via the transfer line 51. In this case, the data is sequentially read from the buffer storage 29 starting from the address indicated by the output pointer 30, and transferred via the transfer line 51 after it is converted into serial data by the parallel/serial converter 32 (arrow 154). The number of transferred bytes can be obtained by initiating a frame length counter 57 by the frame generator 33 via line 59, while controlling over the data transfer operation of the parallel/serial converter 32 via line 110. The frame length counter 57 also instructs a count down of the counter 27 via line 58 and a renewal of the output pointer 30 via line 120. On the side of the remote channel device (RCH) 17, the serial/parallel converter 60 converts the frame transferred via the transfer line 51 into parallel data to decode the control data by the decoder 61 and output it to line 99. In response to the decoded output, a received data controller 98 outputs a renewal signal to line 100 in synchronism with (arrow 156) the time when the received data is stored in the buffer storage 62, the renewal signal being used for renewing the input pointer 63 and corresponding to the number of received data.

On the side of the central channel device (CCH) 15, if the counter 27 becomes zero (arrow 160) and data chaining is indicated by the register 26 (arrow 161) during data transfer from the buffer storage 29 to the remote side, the data chaining instruction circuit 28 outputs a signal to line 45 so that the frame generator 33 judges the end of data transfer and generates a data chaining instruction frame (FIG. 4C) (arrow 162) and sends it to the remote channel device 17 via the parallel/serial converter 32 (arrow 163). Thereafter, data stored in the registers 22 and 21 are set respectively in the counter 27 and the register 26 to start transferring a data transfer frame based on the new counts.

On the side of the remote channel device (RCH) 17, the decoder 61 decodes a control byte X"E6" (arrow 164) upon reception of the data chaining frame. The content of the input pointer 63 is set in a chaining pointer 66 in response to a signal on line 77 (arrow 166). At the same time, a flag 65 indicative of data chaining in the midst of data in the buffer storage 62 is also set (arrow 165). When a data transfer request signal 95 from the I/O device 19 is received at the interface controller 75 of the remote channel device (RCH) 17 via the I/O interface (arrow 167), the buffer storage 62 transfers data starting from the address indicated by the output pointer 67 to the interface controller 75 via data line 89. The interface controller 75 sends the data onto bus 94 and returns a response signal 94' to the buffer storage 62. Simultaneously therewith, the interface controller 75 renews the output pointer 67 via line 102 (arrow 168). The output pointer 67 and the chaining pointer 66 are compared with each other by a comparator 68. If a coincidence signal is outputted on line 78 (arrow 169), the frame generator 71 generates a channel command word renewal frame (FIG. 5A) (arrow 170) and sends it via the parallel/serial converter 74 to the central channel device 15 (arrow 171). The flag 65 is reset by the coincidence signal on line 78.

At the central channel device (CCH) 15, the control byte of the frame is decoded by the decoder 36 to output a channel command word renewal signal 54 to the channel controller (CHC) 14 (arrow 172). In response to this signal, the channel controller (CHC) 14 reads the next channel command word from the main storage 11 and sets it in the registers 21 and 22.

As appreciated from the foregoing operations, the renewal of a channel command word is made at the time when data is transferred to the I/O interface. Therefore, it is possible for the channel controller to control the system in the same manner as with conventional channel devices without spoiling the advantages of buffer storages.

Next, the operation at the end of data transfer will be described. It is necessary for the channel controller 14 to operate to store the address of the last channel command word and the number of remaining bytes in the main storage as an end status, either when no data to be transferred exists in the main storage 11 (i.e., when all data indicated by the channel command words have been transferred to the buffer storage on the I/O device side), or when no data transfer request is sent from the I/O device and an end status is returned therefrom. When no data to be transferred exists in the main storage 11, adjustment in the number of remaining bytes is not necessary so that the description therefor is omitted. In the following, the description will be directed to the case where no data transfer request is sent from the I/O device.

At the remote channel device (RCH) 17, when the interface controller 75 receives an end status from the I/O device via line 101 (arrow 180), the end status is sent to the processor 73 via line 86. Then, the processor 73 checks if the data chaining flag 65 is set via line 79. In case where the flag 65 is set, the value of the data chaining pointer 66 subtracted by that of the output pointer 67 is required to be used as the remaining count at the end of the operation associated with the channel command word concerned. The output of the subtracter 69 indicates the value of the chaining pointer 66 subtracted by the output pointer 67. The processor 73 reads the output of the subtracter 69. Since the flag 65 is being set, the processor sets the control data X"67" of the end frame 2 (FIG. 5F), remaining count (CP−OP) and end status in the register 72 via line 92 and instructs the frame generator 74 to transfer the frame and initiate the parallel/serial converter 74 (arrow 181). Thus, the end frame 2 is transferred to the central channel device 15 (arrow 182). The decoder 36 of the central channel device 15 decodes the control data X"67" obtained via the serial/parallel converter 38 (arrow 183) and the decoded signal is sent to the processor 35 via line 118.

Then, the processor 35 receives the end frame 2 via the serial/parallel converter 38 and the register 37 (arrow 184), and sends the end status and the remaining count (CP−OP) to the channel controller 14 via line 117 (arrow 185).

Alternatively, in case where the flag 65 of the remote channel device (RCH) 17 is not being set, the value (IP−OP) of the input pointer 63 subtracted by the output pointer 67 by the subtracter 69 is read by the processor 73. Since the flag 65 is not being set, the processor 73 sets the control data X"66" of the end frame 1 (FIG. 5E), remaining count (IP−OP) and end status in the register 72 and delivers a frame transfer instruction onto line 87. Thus, the end frame 1 is transferred to the central channel device 15. Upon reception of a decoded result of the control data X"66" channel device adds the remaining count (IP−OP) received from the register 37 and the value of the counter 27 to send the resultant value to the channel controller 14.

The channel controller (CHC) 14 operates to store, as an end information status of the channel command word concerned, the remaining count, end status sent from the central channel device (CCH) 15 and the address stored on the side of the central channel side, in the main storage 11.

I claim:

1. A data input/output control system for controlling data chaining transfers comprising:
   (a) a data processing unit for performing data processing and data transfer in accordance with instructions being executed by said data processing unit;
   (b) a main storage connected to said data processing unit for storing data and said instructions including chaining instructions;
   (c) a channel controlled connected to said main storage for controlling a plurality of input/output data channels using chaining instructions read from said main storage, said channel controller being operated in response to said chaining instructions read from said main storage, and said chaining instructions being outputted by said data processing unit to said main storage;
   (d) at least one transfer line for serially transferring data from said main storage;
   (e) at least one data input/output device connected to said at least one transfer line;
   (f) each input/output data channel includes at least one central channel means connected between said at least one transfer line and said channel controller for sending a chaining instruction from said channel controller to said at least one transfer line, said channel controller being operated in response to said chaining instruction outputted by said data processing unit to said main storage operator, said data processing unit being operated in accordance with said instructions being executed in said data processing unit, and said chaining instruction being indicative of whether data in said main storage at a plurality of addresses is to be chained and transferred to said at least one input/output device; and
   (g) remote channel means, connected between said at least one transfer line and said input/output device and responsive to said chaining instruction sent from said central channel means, for sending, after completion of a current data transfer, an instruction to said central channel means requesting a new data transfer command for a next data transfer.

2. A data input/output control system according to claim 1, wherein said central channel means includes means for performing parallel-to-serial conversion with said at least one transfer line, and means for discriminating a signal to be sent to said transfer line as to whether said signal is to be sent to said transfer line, as to whether said signal is a data or a chaining instruction and sending said signal; and said remote channel means includes means for performing serial-to-parallel conversion with said at least one transfer line, means for discriminating a signal received from said transfer line as to whether said signal is data or a chaining instruction and means for sending as continuous data a plurality of data transferred from said central channel means in response to said chaining instruction, to said input/output device.

3. A data input/output control system according to claim 1, wherein said central and remote channel means each include a buffer storage for storing data, said buffer storage having an input start address and an output start address respectively indicating an input location and an output location of data in said buffer storage; and said buffer storage of said remote channel means has a chaining pointer indicating a start of chained data corresponding to said chaining instruction.

4. A data input/output control system according to claim 3, wherein said remote channel means includes means for storing a number of bytes of data transferred from said central channel means to said remote channel means; means for counting the number of data bytes transferred to said input/output device from said buffer storage of said remote channel means; and means connected between said storing means and said counting means for obtaining the number of bytes not transferred at the time when transfer data for said data transfer command has been received completely.

5. A data input/output control system according to claim 3, wherein said remote channel means includes means for obtaining the number of bytes not transferred and retained in said buffer storage of said remote channel means at the time when transfer data for said data transfer command has been received completely; and said central channel means includes means for obtaining the number of bytes not transferred and retained in said buffer storage of said central channel means at the time when data transfer for said data transfer command has completed, and means for adding said numbers of bytes in said buffer storages of said remote and central channel means.

6. A data input/output control system for controlling data chaining transfers comprising:
   (a) a data processing unit for performing data processing and data transfer in accordance with instructions being executed by said data processing unit;
   (b) a main storage connected to said data processing unit for storing data and said instructions including chaining instructions;
   (c) a channel controller connected to said main storage for controlling a plurality of input/output data channels using said chaining instructions read from said main storage, said channel controller being operated in response to said chaining instructions read from said main storage, and said chaining instructions being outputted by said data processing unit to said main storage;

(d) at least one transfer line for serially transferring data from said main storage;

(e) at least one data input/output device connected to said at least one transfer line;

(f) each input/output data channel including at least one central channel means connected between said at least one transfer line and said channel controller for sending a chaining instruction from said channel controller to said at least one transfer line said channel controller being operated in response to said chain instruction outputted by said data processing unit to said main storage, said data processing unit being operated in accordance with said instructions being executed in said data processing unit, and said chaining instruction being indicative of whether data in said main storage at a plurality of addresses is to be chained and transferred to said at least one input/output device;

(g) said central channel means includes a central buffer storage for storing data to be transferred from said main storage to said data input/output device;

(h) said central buffer storage includes pointer means for indicating a storage location of data already transferred while serial data transfer to said at least one transfer line is carried out;

(i) remote channel means, connected between said transfer line and said input/output device and responsive to said chaining instruction sent from said central channel means, for sending, after completion of a current data transfer, an instruction to said central channel means requesting a new data transfer command for a next data transfer;

(j) a remote buffer storage provided in said remote channel means for storing data transferred from said central buffer storage via said at least one transfer line;

(k) said remote buffer storage includes pointer means for indicating a storage location of data already transferred while transfer of said stored data to said input/output device is carried out;

(l) said remote buffer storage includes pointer means for indicating a storage location designated by said chaining instruction; and (m) said remote channel means includes means for informing said central channel means of an amount of data stored in said remote buffer storage before responding to said data chaining instruction.

7. A data transfer control method for a channel system wherein a channel device for connecting a data processing unit and an input/output device is divided into a central channel device on the data processing unit side and a remote channel device on the input/output device side and both channel devices are connected by a serial transfer line, and wherein a first buffer storage is provided at the central channel device for controlling preliminary receiving of data from a main storage and for controlling the information transfer rate with the serial transfer line and a second buffer storage is provided at the remote channel device for controlling preliminary receiving of data and for controlling the information transfer rate between the serial transfer line and the low speed input/output device, comprising the steps of:

(a) said central channel device informing said remote channel device of a data chaining instruction when a data transfer from the data processing unit side to the input/output device side being performed in response to a current channel command word is completed and a data transfer to be performed in response to a next channel command word starts;

(b) performing a data transfer for said next channel command word; and (c) said remote channel device sending to said central channel device a channel command word renewal instruction when said remote channel device has transferred, to said input/output device, data existing in said second buffer storage before receipt of said data chaining instruction.

8. A data transfer control method for a channel system wherein a channel device for connecting a data processing unit and an input/output device is divided into a central channel device on the data processing unit side and a remote channel device on the input/output device side and both channel devices are connected by a serial transfer line for transferring data in frames, and wherein a first buffer storage is provided at the central channel device for controlling preliminary receiving of data from a main storage and for controlling the information transfer rate with the serial transfer line and a second buffer storage is provided at the remote channel device for controlling preliminary receiving of data and for controlling the information transfer rate between the serial transfer line and the input/output device, comprising the steps of:

(a) in a case where operations for a channel command word is completed at a condition that data transferred from said first buffer storage to said second buffer storage is not transferred to said input/output device and left in said second buffer storage, said remote channel device informing said central channel device of a remaining data amount (CP−OP) before receipt of a data chaining instruction by an end-frame instruction having a control code of data chaining if data stored in said second buffer storage before receipt of said data chain instruction remains in said second buffer storage, and informing said central channel device of a remaining amount of data remaining in said second buffer storage (IP−OP) by an end-frame having a control code of no data chaining if no new data chaining instruction has been received; and (b) said central channel device using said remaining amount from said remote channel device as the remaining amount for a program if there exists a data chaining instruction in said program, and using a value as the remaining amount for said program if there exists no data chaining instruction in said program, said value being obtained by adding said remaining amount from said remote channel device to an amount of data left in said central side buffer storage.

* * * * *